(12) United States Patent
Serre

(10) Patent No.: US 7,437,239 B2
(45) Date of Patent: Oct. 14, 2008

(54) METHOD AND DEVICE FOR DETERMINING THE MINIMAL COST PATH BETWEEN TWO POINTS IN A ROAD NETWORK

(75) Inventor: Julien Serre, Carrieres-sur-Seine (FR)

(73) Assignee: Webraska Mobile Technologies (FR)

( * ) Notice: Subject to any disclaimer, the term of this patent is extended or adjusted under 35 U.S.C. 154(b) by 0 days.

(21) Appl. No.: 10/500,991

(22) PCT Filed: Jan. 9, 2002

(86) PCT No.: PCT/FR02/00061

§ 371 (c)(1),
(2), (4) Date: Jan. 13, 2005

(87) PCT Pub. No.: WO03/058170

PCT Pub. Date: Jul. 17, 2003

(65) Prior Publication Data

US 2005/0119825 A1    Jun. 2, 2005

(51) Int. Cl.
*G01C 21/00* (2006.01)
*G01C 21/32* (2006.01)

(52) U.S. Cl. .................. 701/202; 701/201; 701/209

(58) Field of Classification Search ................ 701/201, 701/202, 209, 208
See application file for complete search history.

(56) References Cited

U.S. PATENT DOCUMENTS

| | | | |
|---|---|---|---|
| 5,041,983 A | | 8/1991 | Nakahara et al. |
| 5,170,353 A | * | 12/1992 | Verstraete .................. 701/202 |
| 5,610,821 A | | 3/1997 | Gazis et al. |
| 5,752,217 A | | 5/1998 | Ishizaki et al. |
| 6,038,559 A | * | 3/2000 | Ashby et al. .................. 707/4 |
| 6,381,535 B1 | | 4/2002 | Durocher et al. |
| 2002/0169543 A1 | * | 11/2002 | Blewitt ...................... 701/202 |
| 2004/0039520 A1 | * | 2/2004 | Khavakh et al. ............ 701/201 |

FOREIGN PATENT DOCUMENTS

EP    0 854 353 A2    7/1998

* cited by examiner

*Primary Examiner*—Khoi H. Tran
*Assistant Examiner*—Brian J. Broadhead
(74) *Attorney, Agent, or Firm*—Akerman Senterfitt

(57) ABSTRACT

The invention relates to a network comprising numerous nodes which are paired by means of segments. The inventive method consists in: allocating a cost to each segment in the network; producing two path graphs, essentially from two points respectively; interrupting the production of the two graphs when they comprise at least a first common interference node; determining the two minimal cost paths which belong respectively to the two graphs; and linking the two minimal cost paths in order to obtain the minimal cost path between the two points. The invention also relates to a server which is used to implement said method.

10 Claims, 3 Drawing Sheets

Parents Table

| nodes | parent nodes | cost | flag |
|---|---|---|---|
| $P_0$ | X | 0 | 1 |
| $P_1$ | $P_4$ | 5 | 1 |
| $P_2$ | $P_0$ | 2 | 1 |
| $P_3$ | $P_2$ | 5 | 1 |
| $P_4$ | $P_0$ | 1 | 1 |
| $P_5$ | $P_0$ | 4 | 1 |
| $P_6$ | $P_7$ | 6 | 1 |
| $P_7$ | $P_0$ | 3 | 1 |
| $P_8$ | $P_7$ | 7 | 1 |
| $P_z$ | $P_7$ | 5 | 1 |

Buckets Table

| cost | node |
|---|---|
| 0 | $P_0$ |
| 1 | $P_4$ |
| 2 | $P_2$ |
| 3 | $P_7$ |
| 4 | $P_5$ |
| 5 | $P_1$ |
| 5 | $P_3$ |
| 5 | $P_z$ |
| 6 | $P_6$ |
| 7 | $P_8$ |

METHOD AND DEVICE FOR DETERMINING THE MINIMAL COST PATH BETWEEN TWO POINTS IN A ROAD NETWORK

The invention relates to a method for determining a minimal cost path between two points of a road network.

This type of method is used in particular by road navigation aid systems which are designed to determine the lowest-cost road path between a point of arrival and a point of departure at a given moment, in order to assist a motor vehicle driver. In this case, the cost can be a cost in terms of time, distance, money, road comfort or any other parameter.

Two main types of algorithms exist which make it possible to determine the minimal cost road path between a point of departure and a point of arrival.

In both cases, the road network is represented by a plurality of nodes (graphs) which are connected in pairs by segments which correspond to portions of road axis (street, road, motorway or another route). A cost is attributed to each segment.

The first algorithm consists of developing a path graph starting from the point of departure and going as far as the point of arrival, without a priori knowing the position of the point of arrival. The graph is developed concentrically around the point of departure, and therefore has a globally circular form. During the development of the graph, there is simultaneous determination of the respective costs of the different paths, and selection of the optimal path, with the minimal cost, which connects the point of departure and the point of arrival.

With the second type of algorithm, which is qualified as "heuristic", the point of arrival is determined and a path graph in the form of a drop is developed, starting from the point of departure and going as far as the point of arrival, taking into account the distance.

With the first calculation algorithm, the graph extends on a circular surface which is centred around the point of departure, and has a radius R equal to the distance between the point of departure and the point of arrival. The surface analysed is therefore very large. As a result, the calculation time is very lengthy.

With the second calculation algorithm, the surface analysed is considerably reduced, as a result of the form of the graph. However, the calculation time by means of nodes is far longer, such that the global calculation time is also lengthy.

The object of the present invention is to eliminate these disadvantages, in other words to reduce the calculation time of a path between two points, via a transport network.

For this purpose, the invention relates to a method for determining the minimal cost path between two points, via a transport network comprising a plurality of nodes which are connected in pairs by segments, wherein:
- a cost is attributed to each segment of the network;
- a path graph is developed, substantially starting from at least one of the two points; and
- the minimal cost path which connects the two points is determined, the method being characterised in that
- two path graphs are developed, substantially starting from two points respectively;
- the development of the two graphs is interrupted when they comprise at least one first common interference node;
- the two minimal cost paths belonging respectively to the two graphs are determined; and
- the two minimal cost paths are connected in order to obtain the minimal cost path between the two points.

The cost may be a cost in terms of time, distance, money, road comfort or another factor.

The invention thus consists of developing two graphs, starting respectively from two points, until these two graphs meet, whereas according to the prior art, a single graph was developed from one of the two points, until this graph reached the other point. This therefore reduces considerably the surface analysed, and consequently the number of nodes, without increasing the calculation time per node.

The solution according to the invention, which may appear simple a posteriori, was not simple for persons skilled in the art who were attempting to reduce the calculation time. In fact, it was not obvious a priori to reduce the calculation time by increasing the number of graphs developed.

By interrupting the development of the graphs whilst they comprise a first interference node, it is thus possible to divide the surface analysed substantially into two.

Advantageously, if at least one of the points is situated substantially at the location of a node, the corresponding graph is developed starting from the said node.

Also advantageously, for at least one of the two points, at least two adjacent nodes of the said point are sought, a non-zero basic cost is attributed to each of these two nodes, and a single graph is developed starting from these two nodes.

In this case, and preferably, the two nodes form a segment on which the point is substantially situated, and the basic cost of each node is determined by proportionality starting from the cost of the segment between these two nodes. If a node is inaccessible, for example because of a no-entry, it is not taken into account.

Thus, in the case when the point is not situated in the location of a node of the network, the graph is developed starting from the nodes which are situated in the vicinity of the point, by attributing a non-zero basic cost to these nodes. Ultimately this is tantamount to developing the graph virtually, starting from the point concerned.

According to a particular embodiment,
- the segments are classified according to a plurality of network levels;
- during the development of at least one of the two graphs, the number of segments of the graph which belong to the lowest level $m_{inf}$ is calculated; and
- starting from a predefined threshold of number of segments of level $m_{inf}$, the graph is developed taking into account only the segments which belong to the levels which are strictly higher than the level $m_{inf}$.

Thus, when the graph contains a number of segments of level $m_{inf}$ which is higher than the threshold, there is transition from the level $m_{inf}$ to the following level $m_{inf+1}$ and the development of the graph is continued by taking into account only the segments with a level higher than, or equal to, the level $m_{inf}$. This therefore reduces considerably the number of calculations, and consequently the calculation time.

In this case, and preferably,
- during the development of the two graphs, there is calculation of the number of segments of each graph which belong to the lowest level $m_{inf}$; and
- when the number of segments of level $m_{inf}$ for the two graphs has reached the said threshold, the development of the two graphs is continued, taking into account only the segments which belong to the levels which are strictly higher than the level $m_{inf}$.

Thus, there is transition from the level $m_{inf}$ to the level $m_{inf+1}$ only when the two graphs contain a number of segments with a level $m_{inf}$ which is higher than the threshold. If the number of segments with the level $m_{inf}$ of one of the two graphs never reaches the threshold, account is taken of all the segments with a level higher than, or equal to $m_{inf}$ for the development of the two graphs.

Also preferably, the development of the said graph is started by taking into account all the segments which belong to all the levels of the network.

Advantageously:

a group of successive segments with a given level m is sought, comprising exclusively intermediate nodes which do not belong to any segment with a level which is at least equal to m, other than those of the group of successive segments with the level m concerned; and the group of successive segments is substituted by a single segment with a level m.

By definition, a "intermediate" node is a node contained between the two end nodes of a succession of adjacent segments.

This therefore creates a virtual network comprising a greatly reduced number of nodes.

Each graph can be developed in a globally concentric manner, for example by using a bucket algorithm.

In the preferred implementation of the method according to the invention, having found the first common interference node Pi, the optimal interference node $P_{i0}$ is sought from amongst the nodes already analysed, in order to determine the two minimal cost paths which contain the optimal interference node $P_{i0}$.

The invention also relates to the road navigation aid server for implementation of the method, comprising an interface for connection to a communication network, a block for receipt of requests from client terminals, a block for receipt of road network data, a block for classification of road segments, a block for creation of a virtual road network, a block for labelling of road segments, a calculation module and a transmission block.

The invention will be better understood by means of the following description of the method for determination of the minimal cost path between at least two points, through a transport network, according to a particular embodiment of the invention, with reference to the attached drawing, in which.

Figure 1:
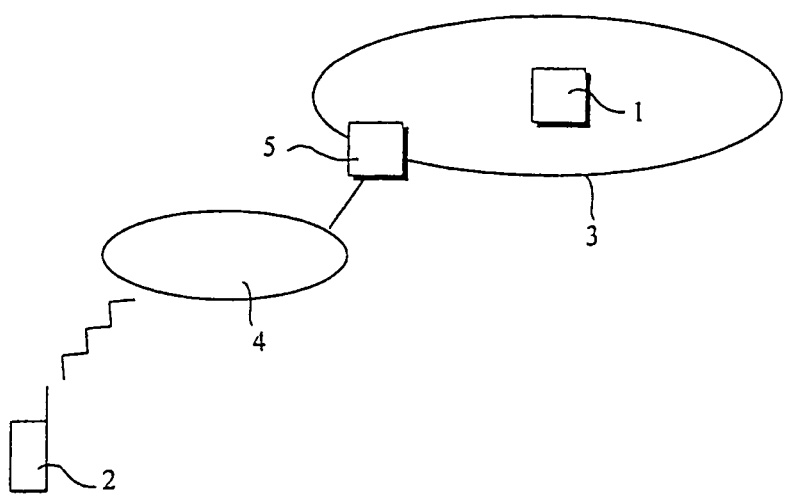
FIG. 1 represents a diagram of a client terminal which is connected to a road navigation aid server via the Internet.
Figure 2:
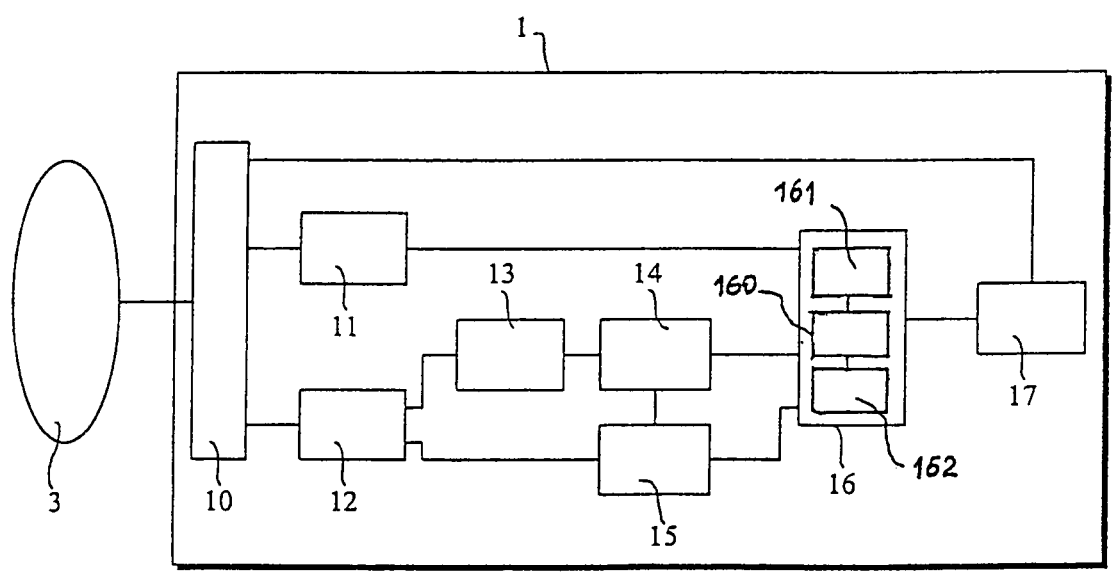
FIG. 2 represents a functional block diagram of the navigation aid server in FIG. 1.

The method according to the invention makes it possible to determine the minimal cost path, in this case based on time, between two points, through a road transport network.

In the particular example in the description, this method is implemented by a road navigation aid server 1 which is connected to a communication network 3, in this case the Internet, and is designed to indicate to client terminals, at the request of the latter, the minimal cost path to connect a point of departure and a point of arrival through the road transport network.

The client terminals comprise cellular telephones which can be connected to the Internet 3, by telephone connection to an access supplier 5, via a cellular telephone network 4, and can communicate via the Internet 3.

The server 1 comprises an interface 10 for connection to the Internet 3, a block 11 for receipt of requests from client terminals, a block 12 for receipt of data relating to the road network, a block 13 for classification of road segments, a block 14 for creation of a virtual road network, a block 15 for labelling of road segments, a calculation module 16 and a transmission block 17.

The receiver block 11 is connected at its input to the Internet connection interface 10, and at its output to the calculation module 16. The block 11 is designed to receive requests for determination of a minimal cost road path, between a point of departure and a point of arrival, emitted by client terminals. Each request contains an indication of location of the point of departure and an indication of location of the point of arrival.

The receiver block 12 is connected at its input to the Internet connection interface 10, and at its output to the labelling block 15 and to the classification block 13. Via the Internet 3, this block 12 is designed to acquire from supplier servers, not shown, data relating to the road network, comprising in particular vectorial cartography data and information concerning the road traffic, which is regularly updated. The road network map comprises a plurality of nodes, which are connected in pairs by segments corresponding to portions of road axes. These road axes comprise streets, roads and motorways. It will be noted at this point that the invention also applies to public transport networks, for example by rail, such as an underground network, and by sea, such as a ferry network.

The classification block 13, which is connected to the creation block 14, is designed to classify the road segments in this case according to three levels, with an index one, two and three, corresponding respectively to streets, roads and motorways. The index of a level depends on the size of the road axes of this level. In this case, the higher the level, the larger the size of the road axes of this level.

The creation block 14, which is connected to the calculation block 16, is designed to create a virtual road network, in this case comprising a reduced number of segments of level 3. In order to create this virtual network, the block 14 searches in the road network for groups of successive segments of level three, such that each group comprises exclusively intermediate nodes which do not belong to any segment of level three other than those of the group of successive segments of level three concerned. "Intermediate" node means a node which is contained between the two end nodes of a succession of adjacent segments. The block 14 then replaces each group of successive segments of level three found with a single virtual segment of level three, thus connecting the two end nodes of the succession of segments of the group concerned.

The labelling block 15, which is connected to the blocks 12, 14 and 16, is designed to attribute a cost to each segment of the virtual road network, and to update this cost regularly by means of road traffic information received by the block 12.

The calculation module 16 comprises a graph development block 160, a block 161 for detection of a change of level of segments, and a block 162 for determination of the minimal cost path.

At the request of a client terminal, the development block 160 is designed to develop two road path graphs, starting from the point of departure and the point of arrival respectively, taking into account the state of the road traffic, in this case using a buckets algorithm.

The buckets algorithm is a graph calculation algorithm, The reader may refer to the work "Graph algorithms" by Christian PRINS, published by Eyrolles, second edition 1997, in order to obtain additional information concerning this algorithm.

In order to explain the buckets algorithm briefly, a description will now be given by way of example of the development of a graph by the calculation module 16, starting from a node $P_0$ and going as far as a node $P_Z$, through the road network, by means of the buckets algorithm, with reference to FIGS. 3 to 5.

The road network contains a plurality of nodes $P_n$, with n varying from 0 to N, connected in pairs by segments. Each segment is associated with a cost. FIG. 3 shows the road network partially. The cost of each segment between two nodes is indicated in brackets.

Figures 3, 4, 5:
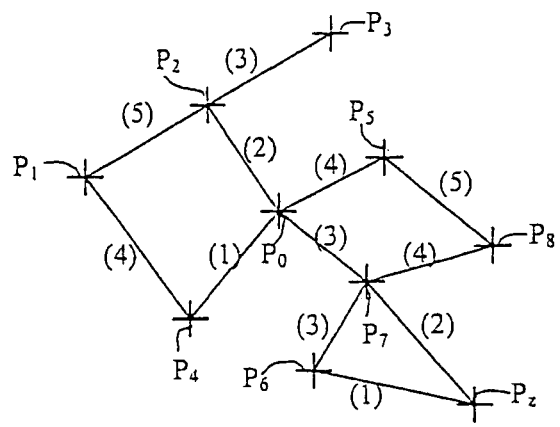
FIG. 3 represents a partial view of a road network.
FIGS. 4 and 5 represent respectively a parents table and a buckets table, after the development of a graph through the road network in FIG. 3.
Figure 6:
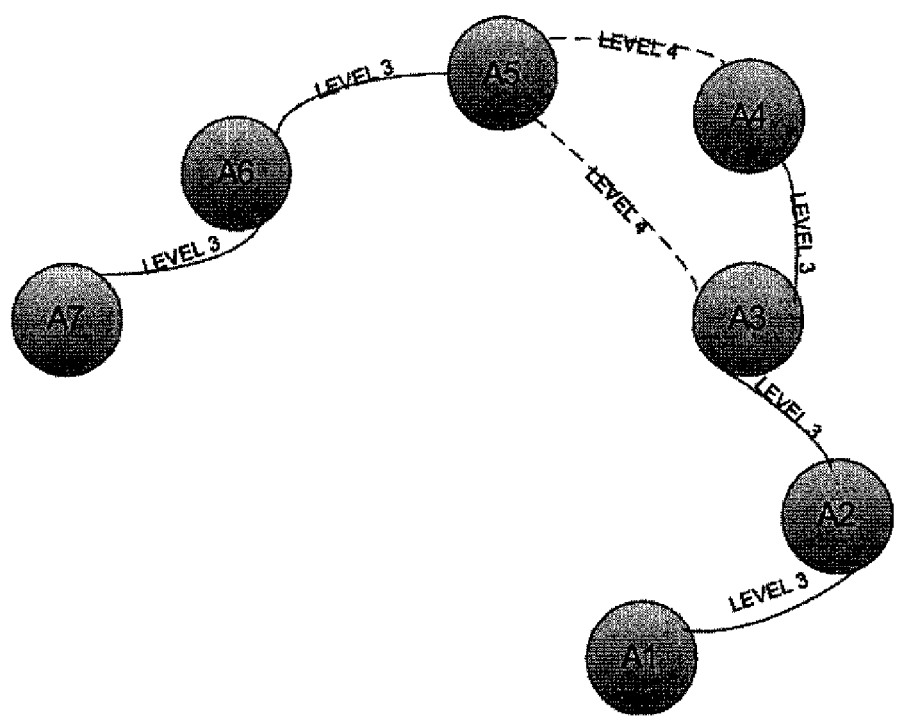
FIG. 6 represents a functional block diagram where the segments are classified according to different levels.
Figure 7:
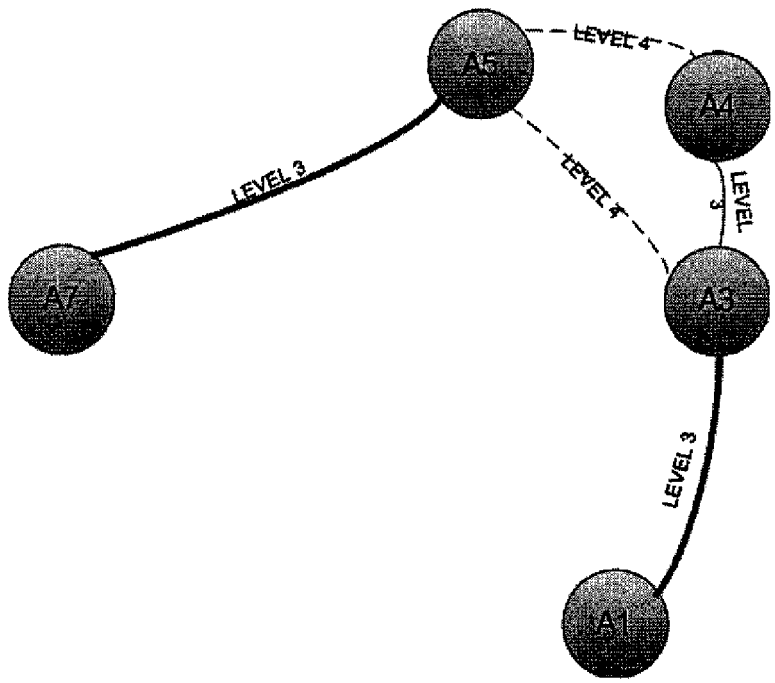
FIG. 7 represents the functional block diagram of FIG. 6 where group of segments of level 3 are substituted by a single segment of level 3.

In order to develop the graph, the development block 160 uses two tables, which are known respectively as the "parents table" and "buckets table" and are shown respectively in FIGS. 4 and 5.

The parents table comprises:
- a first column of nodes, which lists all the nodes in the network;
- a second column of parent nodes, which, for each node in the network is designed to contain a parent node associated with this node;
- a third column of costs, which is designed to contain the cost of the node, for each node in the network; and
- a fourth column, which for each node in the network is designed to contain a selection index which is known as a "flag", indicating whether or not this node has already been selected to form part of the graph, depending on whether the value of the flag is one or zero.

By definition, a "parent" node $P_n'$ of a node $P_n$ is a node which is connected to the node $P_n$ by a single segment, and is situated upstream from the node $P_n$ along a graph path. The node $P_n$ is in fact a "descending" node in relation to the node $P_n'$. It will be noted that the parent node $P_n'$ can have several descending nodes which belong respectively to several graph paths.

The buckets table is designed to contain the list of nodes of the graph, i.e. the nodes which are selected to form part of the graph, and are classified in increasing cost order, as well as the cost associated with each of these nodes. By definition, the cost of a node for a given path corresponds to the cost of the path between this node and the node of origin of the graph, which is equal to the sum of the costs of the segments which form this path.

The development of the graph of the node of origin $P_0$ as far as the node $P_Z$ is carried out in accordance with the steps described hereinafter.

In the parents table, the column of the parent nodes and the column of the costs are initially empty, and all the flags are initially set to zero. The buckets table is initially empty. For the sake of clarity, the parents table contains only the nodes $P_0, \ldots, P_8, P_Z$, which are necessary for understanding of the following description.

It will be noted immediately that the fact of selecting a node of the network consists of introducing this node into the graph.

Initial Step

The node of origin $P_0$ is selected and this node $P_0$ is classified with an associated initial cost, at the head of the list, in the buckets table. In addition, in the parents table, the initial cost of the node $P_0$ is indicated, and the flag of the node $P_0$ is set to one. The node $P_0$ is not associated with any parent point.

Steps of Development of the Graph

The first node on the list of the buckets table is analysed, i.e. $P_0$. For this purpose, all the nodes adjacent to the node $P_0$ are sought. By definition, the nodes which are "adjacent" to a node $P_n$ are the nodes of the network which are connected to the node $P_n$ by a single segment (it is rare for there to be several of them). It is thus determined that the nodes $P_4, P_2, P_7$ and $P_5$ are adjacent to the node $P_0$, these adjacent nodes are selected, and they are classified in the buckets table with their respective associated costs, in increasing order of cost. In the parents table, for each node selected $P_4, P_2, P_7$ and $P_5$, the flag of this node is set to one, this node is associated with the parent node $P_0$, and the cost of this node is indicated.

There is then analysis, one after the other, in their order of classification, of the following nodes on the list of the buckets table. As the successive nodes on the list of the buckets table are analysed. the graph is developed by enriching the buckets table until the node $P_Z$ is selected, in other words until the graph reaches the node $P_Z$, as explained hereinafter.

For the analysis of each node $P_n$ on the list, the nodes adjacent to this node $P_n$ are sought and determined. From amongst these adjacent nodes, there is selection of the node(s) which has/have not already been selected. For each adjacent node which has already been selected, the new cost of this node is calculated, taking into account the fact that it belongs to another path (the one which passes via the node analysed $P_n$). If the new cost of the node concerned is lower than its former cost (shown in the parents table), this node is selected. Otherwise, the node concerned is not selected.

After having analysed the point $P_n$, the node(s) selected is/are classified in the buckets table, with their respective associated costs, in increasing order of cost. In addition, in the parents table, for each node selected, the parent node $P_n$ is associated with this node (by replacing the former parent node with the node $P_n$, in the case when the node concerned has already been selected), the cost of this node is indicated (by substituting this cost for the former one, in the case when the node concerned has already been selected), and the flag of this node is set to one.

A globally concentric graph is thus developed around the point of origin $P_0$. The graph therefore has a substantially circular form, which is centred around the point of origin $P_0$.

Final Step

After having selected the node $P_Z$, in other words when the graph has reached the node $P_Z$, the optimal cost path is reconstituted by going back up from the node $P_Z$ to the node $P_0$, node by node, by means of the parent relations between nodes shown in the parents table. This therefore determines that the minimal cost path is the path $P_0 \rightarrow P_7 \rightarrow P_Z$.

As each graph is developed, the detection block 161 which is connected to the development block 160 is designed to calculate the number of segments of the lowest level $m_{inf}$ which belong to the graph concerned, to detect the exceeding of a threshold of a number of segments of level $m_{inf}$, and to indicate to the development block 160 that this threshold has been exceeded by the two graphs, such that the block can continue the development of the two graphs, taking into account only the segments which belong to the levels which are strictly higher than the level $m_{inf}$.

The block 162 for determination of the optimal path (i.e. the minimal cost path), which is connected to the development block 160, is designed to reconstitute the minimal cost path between two nodes, by means of the parent relations between nodes shown in the parents table.

The transmission block 17, which is connected to the calculation module 16 and to the Internet connection interface 10, is designed to emit a message to each requesting terminal in order to notify it of the optimal path between the point of departure and the point of arrival.

The method for determining the minimal cost road path between a point of departure A and a point of arrival B through the road network will now be explained. The points A and B are each situated substantially in the location of a road network node.

By means of the information relating to road traffic, the classification block 13 classifies the segments of the road network according to the three network levels (street, road, motorway). The block 14 then creates a virtual road network, comprising a reduced number of segments of level three, as previously explained.

The labelling block 15 attributes a cost to each segment of the virtual road network, and regularly updates this cost, by means of traffic information received. The cost of a virtual segment of level three, corresponding to a group of successive segments of the road network of origin, is equal to the sum of the costs of the segments of this group.

A client terminal 2 sends the server 1 a request for determination of the minimal cost path between the point of departure A and the point of arrival B, containing an indication of location of the point A and an indication of location of the point B.

In the server 1, the receiver block 11 receives the request of the terminal 2, extracts from it the location indications of the points A and B, and supplies these to the calculation module 16.

Simultaneously, the development block 160 develops two path graphs, respectively starting from the two points A and B, and determining the respective costs of the different paths of each graph, by means of the buckets algorithm previously explained. Since the points A and B are situated substantially in the location of a node of the network, each point A, B is assimilated with the node situated in the vicinity, with attribution of a zero basic cost to this node.

The block 160 starts the development of the two graphs by using the segments of the three network levels.

During the development of the two graphs, the detection block 161 calculates the number of segments of each graph which belong to the lowest level, i.e. level one. If the number of segments of level one for the two graphs reaches a predefined threshold $S_1$, the block 161 detects this and informs the development block 160 accordingly. The latter continues the development of the two graphs beyond this threshold by using only the segments which belong to levels two and three, which are strictly higher than level one, and simultaneously calculates the number of segments of each graph which belong to the remaining lowest level, i.e. level two. If the number of segments of level two for the two graphs reaches a predefined threshold $S_2$, the block 160 detects this and informs accordingly the development block 161, which continues the development of the two graphs beyond this threshold $S_2$ by taking into account only the segments of level three, which are strictly higher than level two. It will be noted that if the number of segments of level one of one of the two graphs does not reach the threshold $S_1$, the development block 161 develops the two graphs by taking into account the three levels, even if the number of segments of level one of the other graph reaches and exceeds the threshold $S_1$.

As soon as the two graphs comprise a first common interference node $P_i$, in other words as soon as a single interference node $P_i$ has been selected in the development of the two graphs, the development block 161 interrupts the development of the two graphs.

When this first common interference node $P_i$ has been found, the buckets tables are analysed once more in order to deduce the optimal interference node $P_{io}$ corresponding to the minimal cost paths, and which has necessarily previously been analysed and is in the buckets table of one or the other of the points of departure and arrival, which will now be demonstrated by a reduction ad absurdum method of reasoning.

Let this be a two-way calculation.

The calculation from the departure to the arrival is known as C0, and the calculation from the arrival to the departure is known as C1.

The costs of reaching each point, respectively according to the calculation C0 and according to the calculation C1, are known as V0[ . . . ] and V1[ . . . ].

The calculation algorithm finds a first point of intersection between C0 and C1, known as X, which is thus a point which has been selected by C0 and C1. The total cost of the path which passes via X is V[X]=V0[X]+V1[X].

It will be shown that if a point Y exists such that V[Y]<V[X], and therefore if the path which passes via Y has a better cost than that which passes via X, then Y has already been analysed either by C0 or C1, and is therefore in the buckets table of one or the other.

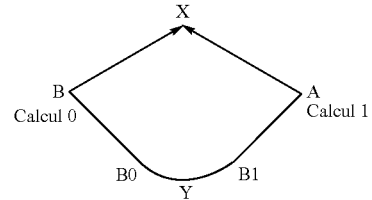

(Calcul=Calculation)

Let B0 and B1 be the parent points of Y in the two calculations.

Let us consider that Y has not been analysed either by C0 or by C1.

Y has not been analysed by C0, therefore B0 has not been selected by C0, therefore V0[B0]>=V0[X]

Y has not been analysed by C1, therefore B1 has not been selected by C1, therefore V1[B1]>=V1[X]

Since V[Y]=V0[Y]+V1[Y] and V0[Y]>V0[B0], V1[Y]>V1[B1]there is V[Y]>V0[B0]+V1[B1]

Thus, V[Y]>V0[X]+V1[X]

V[Y]>V[X]

It is therefore deduced from this that if V[Y]<=V[X], Y has necessarily already been analysed (B0 or B1 has already been selected). Thus, Y is necessarily in the buckets table of C0 or C1.

Since X has been found, it is therefore sufficient to go through the content of the two buckets tables in order to find any points, the path of which has a better cost than X.

Let us now consider that Y is a junction point of C0 and C1 which is better than X.

If B0 has not already been selected by C0, then V0[B0]>V0[X]

In order for the journey via Y to have a better cost nevertheless, it is necessary to have V1[B0]=V1[Y]+cost of [B0, Y]>V1[X]

As a result, B0 has already been selected by C1. Thus, Y is not the meeting point of C0 and C1. This is absurd by definition.

The same reasoning applies for B1.

As a result:

B0 and B1 had already been selected at the moment when X was found.

The block 162 then reconstitutes the optimal path between the point A and the interference node $P_{io}$ and the optimal path between the point B and the interference node $P_{io}$ by means of the parent relations between nodes shown in the parents table, and associates and connects these two optimal paths in order to obtain the minimal cost path between the two points A and B.

If at least one of the two points A, B, for example the point A, is not situated substantially in the location of a node of the network, the development block 160 seeks at least two nodes $P_{A,0}$, $P_{A,1}$, ..., which form a segment, and within which the point A is substantially situated.

The block 160 then attributes to each of the nodes $P_{A0}$, $P_{A1}$, ..., which form a segment, a basic non-zero cost, which is determined by proportionality starting from the cost of the segment concerned, as explained hereinafter. Let $P_{A,n}$ and $P_{A,n+1}$, be two adjacent nodes of the point A, forming a road segment on which the point A is substantially situated. The basic cost $c(P_{A,n})$, $c(P_{A,n+1})$ of each node $P_{A,n}$, $P_{A,n+1}$ is calculated by means of the following ratios:

$$c(P_{A,n}) = c(P_{A,n}, P_{A,n+1}) - \frac{d(A, P_{A,n})}{d(P_{A,n}, P_{A,n+1})}$$

$$c(P_{A,n+1}) = c(P_{A,n}, P_{A,n+1}) - \frac{d(A, P_{A,n+1})}{d(P_{A,n}, P_{A,n+1})}$$

in which $c(P_{A,n}, P_{A,n+1})$, $d(P_{A,n}, P_{A,n+1})$, $d(A,P_{A,n})$ and $d(A, P_{A,n+1})$ represent respectivly the cost of a segment which connects $P_{A,n}$ and $P_{A,n+1}$, the distance between $P_{A,n}$ and $P_{A,n+1}$, distances between $P_{A,n}$ and A, and the distance between $P_{A,n+1}$ and A.

In order to develop the graph from the point A, the procedure is as follows.

During the initial step, after having determined the nodes $P_{A,n}$ which are in the vicinity of the point A, the basic cost of each of these nodes $P_{A,n}$ is determined, they are selected, and are classified in the buckets table in increasing order of cost. In the parents table, each node $P_{A,n}$ is associated with the parent point A, the cost of this node $P_{A,n}$ is indicated, and its flag is set to one.

During the following steps of development of the graph, the nodes on the list of the buckets table are analysed in succession, in their order of classification, whilst progressively selecting new nodes to develop the graph, as previously explained.

A single graph is therefore developed from several departure nodes, to which a non-zero basic cost is attributed. A procedure of this type is followed for example when the point of departure or arrival is situated in a street, between two nodes, or on a square into which several streets open, a node being situated at each intersection between the square and a street.

After determination of the minimal cost path, the emission block 17 transmits to the requesting terminal notification, indicating the minimal cost path between the two points A and B, via the Internet 3 and the cellular network 4.

The road network could be subdivided into two levels or into more than three levels.

In the preceding description, the navigation aid server creates a virtual network by grouping together the successive segments of level three. In general, in the case when the road network is subdivided into M levels, the navigation aid server could seek groups of successive segments of a given level m comprising exclusively intermediate nodes which do not belong to any segment with a level which is at least equal to m (i.e. which is greater than, or equal to m) other than those of the group of segments concerned, then replace each group of successive segments by a single segment of level m.

In addition, again in the general case in which the road network is subdivided into M levels, during the development of the two graphs the navigation aid server could calculate the number of segments of each graph which belongs to the lowest level $m_{inf}$, and after the number of segments of level $m_{inf}$ for the two graphs has reached a predetermined threshold, it could develop the two graphs, taking into account only the segments which belong to the levels which are strictly higher than the level $m_{inf}$, the new lower level taken into account becoming the level $m_{inf+1}$. The server could reiterate this operation by incrementing the lower level as the graphs are developed.

A graph calculation algorithm other than the buckets algorithm could be used. In this case, the graphs could be developed in a non-concentric manner.

Instead of interrupting the development of the two graphs as soon as they comprise a first common interference node, it could be interrupted when the two graphs comprise several common interference points, and the optimal path between the two points of departure and arrival could be determined, passing via one of these interference nodes.

The navigation aid server could be designed to determine the minimal cost path in terms of distance, money, road comfort or another factor.

The client terminals could be connected to the navigation aid server by a communication network other than the global network comprising the Internet and the cellular network.

The method according to the invention could also be implemented by a system other than a navigation aid system, and for a transport network other than a road network, for example a railway network.

The invention claimed is:

1. A method for determining the minimal cost path between two points (A,B), via a transport network comprising a plurality of nodes ($P_n$) which are connected in pairs by segments, the method comprising the steps of:

attributing a cost to each segment of the network;

developing two path graphs, substantially starting from two points (A,B);

classifying the segments according to a plurality of network levels and for each network level, attributing a predefined threshold of number of segments of said level;

during the development of at least one of the two graphs;

searching a group of successive segments with a given level m, comprising exclusively intermediate nodes which do not belong to any segment with a level which is greater than or equal to m, other than those of the group of successive segments with the level m concerned; and the group of successive segments is substituted by a single segment with a level m;

calculating the number of segments of the graph of a lowest level $m_{inf}$;

if the number of segments of the graph developed of a lowest level minf is equal or greater than starting from a predefined threshold of number of segments of level $m_{inf}$, said at least one of the two path graphs is developed taking into account only the segments which belong to the levels which are strictly higher than the level $m_{inf}$, the number of segments of the graph developed of a lowest level $m_{inf}+1$ is calculated;

if the number of segments of the graph developed of a lowest level $m_{inf}+1$ is equal or greater than a predefined threshold of number of segments of level $m_{inf}+1$, said at least one of the two path graphs is developed taking into account only the segments which belong to the levels which are strictly higher than the level $m_{inf}+1$;

interrupting the development of the two path graphs when they comprise at least one first common interference node ($P_i$);

determining two minimal cost paths belonging respectively to the two path graphs; and connecting said two minimal cost paths in order to obtain a minimal cost path connecting the said two points (A,B).

2. Method according to claim 1, wherein, in the case when at least one of said two points (A,B) is situated substantially at the location of a node, the path graph corresponding to said at least one of said two points is developed starting from the said node.

3. Method according to claim 1, wherein, for at least one of said two points (A,B), at least two adjacent nodes ($P_{A,n}$, $P_{A,n+1}$) of the said at least one (A) of said two points are sought, a non-zero basic cost is attributed to each of these two nodes ($P_{A,n}$, $P_{A,n+1}$), and a single graph is developed starting from these two nodes ($P_{A,n}$, $P_{A,n+1}$).

4. Method according to claim 3, wherein since the two nodes ($P_{A,n}$, $P_{A,n+1}$) from a segment on which the at least one (A) of said two points is substantially situated, a basic cost of each node ($P_{A,n}$, $P_{A,n+}$) is determined by proportionality starting from the cost of the segment between these two nodes ($P_{A,n}$, $P_{A,n+1}$).

5. Method according to claim 1, wherein:

during the development of the two path graphs, the number of segments of each graph of a lowest level $m_{inf}$ is calculated; and when the number of segments of level $m_{inf}$ has reached said predefined threshold for the two path graphs, the development of the two graphs is continued, taking into account only the segments which belong to the levels which are strictly higher than the level $m_{inf}$.

6. Method according to claim 1, wherein the development of said at least one of the two path graphs is started by taking into account each of the segments which belong to any of the levels of the network.

7. Method according to claim 1, wherein each graph is developed in a globally concentric manner.

8. Method according to claim 7, wherein the said two path graphs are developed by using a bucket algorithm.

9. Road navigation aid server for implementation of the method according to claim 1, comprising an interface for connection to a communication network, a block for receipt of requests from client terminals, a block for receipt of road network data, a block for classification of road segments, a block for creation of a virtual road network, a block for labelling of road segments, a calculation module and a transmission block.

10. Server according to claim 9, wherein the calculation module comprises a graph development block, a block for detection of a change of level of segments, and a block for determination of the minimal cost path.

* * * * *